United States Patent
Fernandez-Ruiz et al.

(10) Patent No.: US 9,946,526 B2
(45) Date of Patent: Apr. 17, 2018

(54) DEVELOPMENT AND HOSTING FOR PLATFORM INDEPENDENT APPLICATIONS

(75) Inventors: Bruno Fernandez-Ruiz, Mountain View, CA (US); Daryl Mun-Kid Low, San Jose, CA (US); Martin F. N. Cooper, Fremont, CA (US)

(73) Assignee: EXCALIBUR IP, LLC, Sunnyvale, CA (US)

(*) Notice: Subject to any disclaimer, the term of this patent is extended or adjusted under 35 U.S.C. 154(b) by 0 days.

(21) Appl. No.: 13/437,462

(22) Filed: Apr. 2, 2012

(65) Prior Publication Data
US 2013/0152066 A1    Jun. 13, 2013

Related U.S. Application Data

(60) Provisional application No. 61/568,056, filed on Dec. 7, 2011.

(51) Int. Cl.
| | | |
|---|---|---|
| *G06F 9/44* | (2006.01) | |
| *G06F 9/445* | (2018.01) | |
| *G06F 9/455* | (2018.01) | |

(52) U.S. Cl.
CPC ............ *G06F 8/60* (2013.01); *G06F 9/45529* (2013.01)

(58) Field of Classification Search
None
See application file for complete search history.

(56) References Cited

U.S. PATENT DOCUMENTS

| | | | |
|---|---|---|---|
| 6,052,527 A * | 4/2000 | Delcourt | G06F 8/10 717/138 |
| 7,035,279 B2 | 4/2006 | Bruckman | |
| 7,275,243 B2 | 9/2007 | Gibbons et al. | |
| 7,779,027 B2 | 8/2010 | James et al. | |
| 8,074,217 B2 | 12/2011 | James et al. | |
| 8,108,711 B2 | 1/2012 | Meijer et al. | |
| 8,219,028 B1 | 7/2012 | Flamholz | |
| 8,291,341 B2 | 10/2012 | Tseng et al. | |
| 8,307,331 B2 | 11/2012 | Warila et al. | |
| 8,516,435 B2 * | 8/2013 | Akkiraju et al. | 717/104 |
| 8,595,186 B1 | 11/2013 | Mandyam | |
| 8,922,485 B1 | 12/2014 | Lloyd | |
| 2003/0237050 A1 | 12/2003 | Davidov et al. | |
| 2004/0003400 A1 | 1/2004 | Carney et al. | |
| 2004/0111518 A1 | 6/2004 | Schuyler | |
| 2005/0022188 A1 | 1/2005 | Tameshige et al. | |
| 2006/0123414 A1 | 6/2006 | Fors | |
| 2006/0130046 A1 | 6/2006 | O'Neill | |
| 2006/0206882 A1 | 9/2006 | Illowsky et al. | |

(Continued)

OTHER PUBLICATIONS

Office Action issued on Apr. 9, 2014 in U.S. Appl. No. 13/729,162.

(Continued)

*Primary Examiner* — Chuck Kendall
(74) *Attorney, Agent, or Firm* — Pillsbury Winthrop Shaw Pittman LLP

(57) ABSTRACT

Method, system, and programs for providing development, deployment, and hosting of applications that are interoperable across different device platforms. An application capable of being executed in a plurality of different device formats is generated. The application is deployed to a client device for execution at the client device. Execution of the same application is initiated at a server.

21 Claims, 23 Drawing Sheets

(56) References Cited

U.S. PATENT DOCUMENTS

| | | |
|---|---|---|
| 2006/0218536 A1 | 9/2006 | Kirilline et al. |
| 2007/0083603 A1 | 4/2007 | Faez et al. |
| 2007/0150856 A1* | 6/2007 | Warner ............... G06F 9/44563 717/106 |
| 2008/0127217 A1 | 5/2008 | Wang |
| 2008/0222618 A1* | 9/2008 | Valtchev ............... G06F 9/4443 717/139 |
| 2008/0271045 A1 | 10/2008 | Le Roy |
| 2009/0113250 A1 | 4/2009 | Meijer et al. |
| 2009/0132197 A1 | 5/2009 | Rubin et al. |
| 2009/0287914 A1 | 11/2009 | Shah et al. |
| 2010/0005396 A1 | 1/2010 | Nason et al. |
| 2011/0072082 A1 | 3/2011 | Fujiwaka et al. |
| 2011/0225417 A1 | 9/2011 | Maharajh et al. |
| 2011/0258595 A1 | 10/2011 | Clevenger |
| 2011/0298816 A1 | 12/2011 | Liu et al. |
| 2011/0321028 A1 | 12/2011 | Evans |
| 2013/0046878 A1 | 2/2013 | Fryc et al. |
| 2013/0047150 A1 | 2/2013 | Malasky et al. |
| 2013/0152066 A1 | 6/2013 | Fernandez-Ruiz et al. |
| 2014/0007048 A1 | 1/2014 | Qureshi |

OTHER PUBLICATIONS

Office Action issued on May 9, 2014 in U.S. Appl. No. 13/550,914.
International Search Report corresponding to PCT/US2012/64786 dated Mar. 28, 2013.
Preliminary Report on Patentability issued on Jun. 19, 2014 in PCT/US2012/064786.
Office Action issued on Jun. 12, 2014 in U.S. Appl. No. 13/437,494.
Office Action issued on Sep. 9, 2014 in U.S. Appl. No. 13/719,437.
Office Action issued on Sep. 11, 2014 in U.S. Appl. No. 13/729,162.
Moshchuk et al., "Resource Management for Web Applications in ServiceOS", May 2010, Microsoft Research, Retrieved from http://research.microsoft.com/apps/pubs/default.aspx?id=131540, 15 pages.
Office Action dated Oct. 23, 2014 in U.S. Appl. No. 13/719,515.
Office Action dated Dec. 24, 2014 in U.S. Appl. No. 13/437,494.
Office Action dated Nov. 14, 2014 in U.S. Appl. No. 13/550,914.
Office Action dated Jan. 26, 2015 in U.S. Appl. No. 13/719,437.
Office Action dated May 6, 2015 in U.S. Appl. No. 13/437,494.
Notice of Allowance dated May 8, 2015 in U.S. Appl. No. 13/550,914.
Office Action dated May 14, 2015 in U.S. Appl. No. 13/719,437.
Office Action dated Jul. 29, 2015 in U.S. Appl. No. 13/729,162.
Kosta et al., "Unleashing the Power of Mobile Cloud Computing using ThinkAir", May 2011, retreived from Cornell University Library, http://arvix.org/abs/1105.3232, 17 pages.
Notice of Allowance dated Aug. 19, 2015 in U.S. Appl. No. 13/437,494.
Chris Tucker, "Opium: Optimal Package Install/Uninstall Manager,"29th International Coference on Software Engineering, 2007.
Notice of Allowance dated Sep. 17, 2015 in U.S. Appl. No. 13/719,437.
Office Action dated Sep. 25, 2015 in U.S. Appl. No. 13/719,515.
Office Action dated Apr. 8, 2016 in U.S. Appl. No. 13/719,515.
Office Action dated Jan. 17, 2017 in U.S. Appl. No. 14/821,849.
Office Action dated Jan. 31, 2017 in U.S. Appl. No. 13/719,515.
Office Action dated Jun. 19, 2017 in U.S. Appl. No. 13/719,515.
Office Action dated Jun. 20, 2017 in U.S. Appl. No. 14/821,849.
Office Action dated Oct. 17, 2017 in U.S. Appl. No. 13/719,515.
Office Action dated Nov. 28, 2017 in U.S. Appl. No. 14/821,849.
Office Action dated Feb. 12, 2018 in U.S. Appl. No. 13/719,515.

* cited by examiner

DEVELOPMENT AND HOSTING FOR PLATFORM INDEPENDENT APPLICATIONS

CROSS-REFERENCE TO RELATED APPLICATIONS

The present application claims the benefit of priority to U.S. Provisional Application Ser. No. 61/568,056 filed 7 Dec. 2011, which is incorporated herein by reference in its entirety.

FIELD

The present disclosure relates to methods, systems and programming for developing and hosting platform independent applications. More particularly, the present disclosure is directed to methods, systems, and programming for developing applications that may be executed on any device platform.

BACKGROUND OF THE INVENTION

Recent advancements in technology have resulted in increased usage of different devices and operating systems. Devices such as laptops, smartphones, tablets, and computer systems may operate on a variety of operating systems, including Android, Windows, OS X, and iOS. Users of these devices and operating systems have grown to expect seamless access and increased functionality and interactivity. As a result, users also expect intercompatibility between different devices. To adhere to the high standards set by users, developers and content providers must maintain and develop several versions and permutations for each application written for each different device and each different operating system. For example, the same smartphone application must often be rewritten for at least each of the Android, iPhone, and Windows phone platforms, to say nothing of additional applications that may be needed for specific smartphones manufactured by Samsung, LG, HTC, T-Mobile, Blackberry, etc. Not only must these different versions of applications be developed, but they must also be tested, maintained, and stored. Furthermore, even if the applications are developed to be as similar as possible across different devices and platforms, users may still experience different results when accessing the same application from different smartphones, or from a personal computer, or laptop.

SUMMARY

The embodiments described herein relate to methods, systems, and programming developing and hosting platform independent applications. More particularly, the present disclosure is directed to methods, systems, and programming for developing applications that may be executed on any device platform.

In an embodiment, a method, implemented on at least one computing device, each computing device having at least one processor, storage, and a communication platform connected to a network for providing development and deployment of applications that are interoperable across different device platforms is disclosed. An application capable of being executed in a plurality of different device formats is generated. The application is deployed to a client device for execution at the client device. Execution of the application is initiated at a server. The application may be generated by coding the application to include a JavaScript application framework facilitating both client side and server side execution of the application. The JavaScript application framework includes binders allowing a client device execution of the application to interface with controllers at a server side execution of the application. The application may be deployed to a client device by detecting settings of the client device, and deploying packages to the application based on the detected settings to customize the application for the client device. Furthermore, an indication that the client device is unable to respond to a user instruction to the application may be received. The user instruction may be executed at the application at the server, and a result of the execution of the user instruction may be transmitted to the client device for display at the client device.

In another embodiment, a method implemented on at least one computing device, each computing device having at least one processor, storage, and a communication platform connected to a network for providing deployment of applications that are interoperable across different device platforms is disclosed. An application capable of being executed in a plurality of different device platforms is deployed to a client device. A memory usage of the device is determined to determine if the device has adequate memory to execute the application. A memory management scheme is determined for the client device if the device does not have adequate memory to execute the application. The memory management scheme is transmitted to the client device for implementation.

In another embodiment, a method implemented on at least one computing device, each computing device having at least one processor, storage, and a communication platform connected to a network for utilizing an application facilitating interoperability across different device platforms is disclosed. An application capable of being executed in a plurality of different device platforms is executed. A determination is made that a user input instruction for the application cannot be executed. The user input instruction is transmitted to a server hosting the application for the server to execute the user input instruction. A result of the user input instruction is received from the server for display. The application may be executed in a browser environment. A result of the user input instruction from the server may be displayed such that a user cannot discern that the application could not execute the user input instruction.

In another embodiment, a method implemented on at least one computing device having at least one processor, storage, and a communication platform connected to a network for running an application that is interoperable across a plurality of device platforms is disclosed. An application capable of being executed in a plurality of different device platforms is executed. A determination is made that a network connection with a server is unstable. Binders within the application are invoked allowing the application to execute independent of the network connection to the server.

In another embodiment, a system for providing development and deployment of applications that are interoperable across different device platforms is disclosed. The system includes an application builder for generating an application capable of being executed in a plurality of different device formats. An application hoster deploys the application to a client device for execution at the client device. A server initiates execution of the application at a server. The application builder is configured to code the application to include a JavaScript application framework facilitating both client side and server side execution of the application. The JavaScript application framework includes binders allowing a client device execution of the application to interface with controllers at a server side execution of the application. The system may also include a package management unit for detecting settings of the client device, and deploying packages to the application to customized the application for the client device based on the detected settings. The server may further be configured to receive an indication that the client device is unable to respond to a user instruction to the application, execute the user instruction at the application executing at the server, and transmit a result of the execution of the user instruction to the client device for display at the client device.

In another embodiment, a system for development and hosting of applications that are interoperable across different device platforms is disclosed. The system includes an application builder for producing an application capable of being executed in a plurality of different device platforms. Application development tools add an application framework to the application. An application hoster deploys the application. The application hoster is configured to deploy additional hosted services with the application, the additional hosted services comprising at least one of: privacy controls and parental controls. A package management unit updates the deployed application.

Other concepts relate to software for implementing development and hosting of platform independent applications. A software product, in accordance with this concept, includes at least one machine-readable non-transitory medium and information carried by the medium. The information carried by the medium may be executable program code data regarding parameters in association with a request or operational parameters such as information related to a user, a request, or a social group, etc.

In another embodiment, a machine readable non-transitory and tangible medium having information recorded for providing development and hosting of applications that are interoperable across different device platforms, wherein the information, when read by the machine causes the machine to generate an application capable of being executed in a plurality of different device formats, deploy the application to a client device for execution at the client device, and initiate execution of the application at a server. The application may be generated by coding the application to include a JavaScript application framework facilitating both client side and server side execution of the application. The JavaScript application framework includes binders allowing a client device execution of the application to interface with controllers at a server side execution of the application. The application may be deployed to a client device by detecting settings of the client device, and deploying packages to the application based on the detected settings to customize the application for the client device. Furthermore, an indication that the client device is unable to respond to a user instruction to the application may be received. The user instruction may be executed at the application at the server, and a result of the execution of the user instruction may be transmitted to the client device for display at the client device.

Additional advantages and novel features will be set forth in part in the description which follows, and in part will become apparent to those skilled in the art upon examination of the following and the accompanying drawings or may be learned by production or operation of the disclosed embodiments. The advantages of the present embodiments may be realized and attained by practice or use of various aspects of the methodologies, instrumentalities and combinations set forth in the detailed description set forth below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings.

DETAILED DESCRIPTION

In the following detailed description, numerous specific details are set forth by way of example in order to provide a thorough understanding of the relevant embodiments described herein. However, it should be apparent to those skilled in the art that the present embodiments may be practiced without such details. In other instances, well known methods, procedures, components and/or circuitry have been described at a relatively high-level, without detail, in order to avoid unnecessarily obscuring aspects of the embodiments described herein.

The present disclosure relates to methods, systems and programming developing and hosting platform independent applications. More particularly, the present disclosure is directed to methods, systems, and programming for developing applications that may be executed on any device platform. The embodiments described herein provides a platform that facilitates development and hosting of applications using a cloud infrastructure. The development and hosting platform may deploy applications to client devices to be run locally at the client device or at a server. The deployed applications may also run off-line locally at the client device. The platform provides a web application framework that allows an application to execute both at a client or browser side or at a server side. As a result, application developers do not need to write different code for a server backend and a browser frontend. Additionally, an application may run at the server side even if the client side encounters problems executing the application, because the applications all use a single code base. Furthermore, applications may run in a hybrid runtime utilizing resources of both a client device or client browser and a server.

Figure 1:
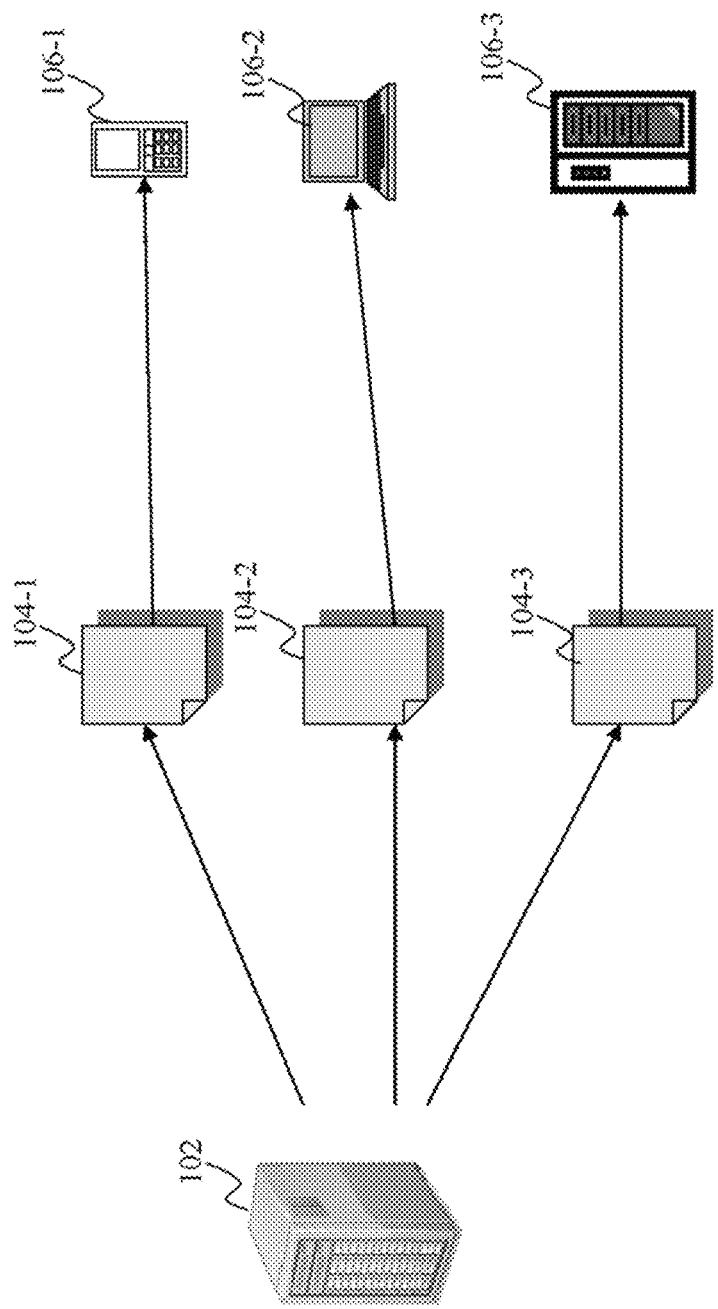
FIG. 1 depicts an exemplary prior art system for developing and deploying applications to different devices.

FIG. 1 depicts an exemplary prior art system for developing and deploying applications to different devices. Server platform 102 is responsible for deploying different applications 104-1, 104-2, and 104-3 to different devices 106-1, 106-2, and 106-3. Each application 104-1, 104-2, and 104-3 represents a different version of the same application that has been programmed to operate and execute specifically on a corresponding device 106-1, 106-2, and 106-3. As shown by FIG. 1, each device requires its own corresponding application to be served to it. For example, application 104-1 corresponds to device 106-1, application 104-2 corresponds to device 106-2, and application 104-3 corresponds to device 106-3. Thus, development of applications can be inefficient, and due to time and cost constraints for developers, applications tailored for certain devices may simply not be developed due to these constraints.

Figure 2:
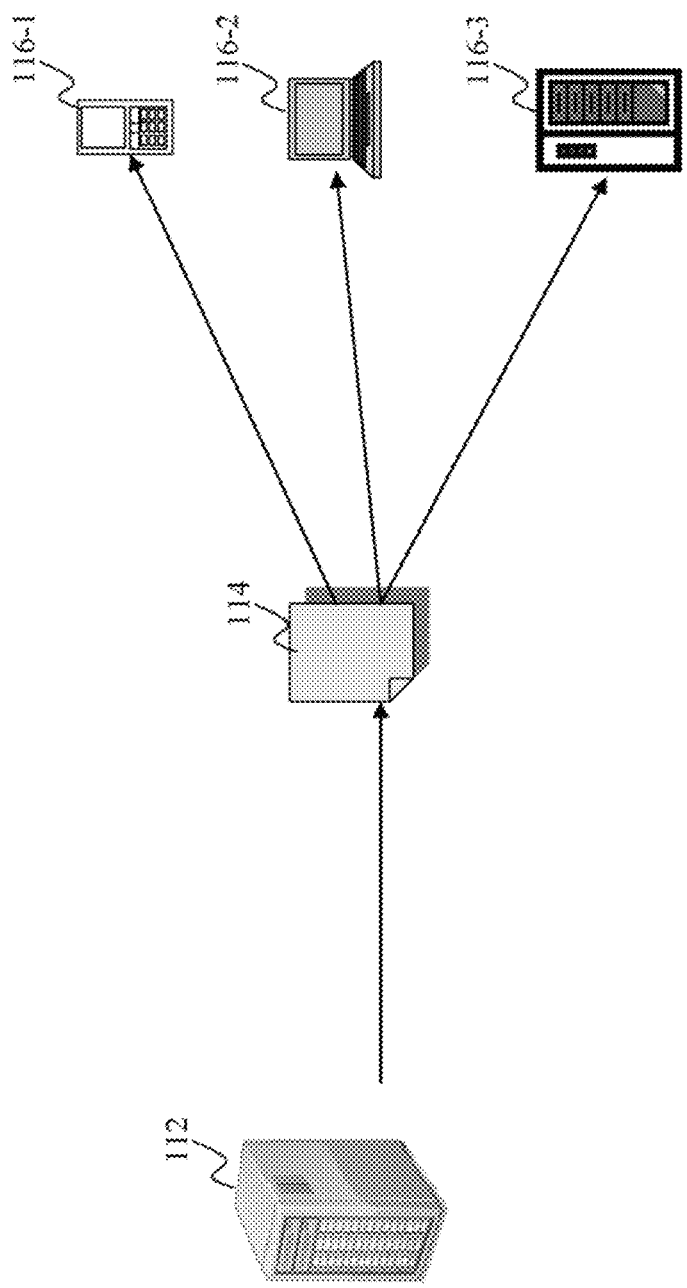
FIG. 2 depicts a system for developing and deploying a single application that is interoperable with a plurality of device platforms in accordance with an embodiment of the present disclosure.

FIG. 2 depicts a system for developing and deploying a single application that is interoperable with a plurality of device platforms in accordance with an embodiment of the present disclosure. Development and hosting platform 112, described in further detail in the paragraphs below, allows developers to develop a single application 114, that may be deployed to different devices 116-1, 116-2, and 116-3. Application 114 is written in a fashion that allows application 114 to be interoperable between different devices. Thus, developers only need to develop the application once and serve it across a network to any number of devices running any type of operating system.

Figure 3:
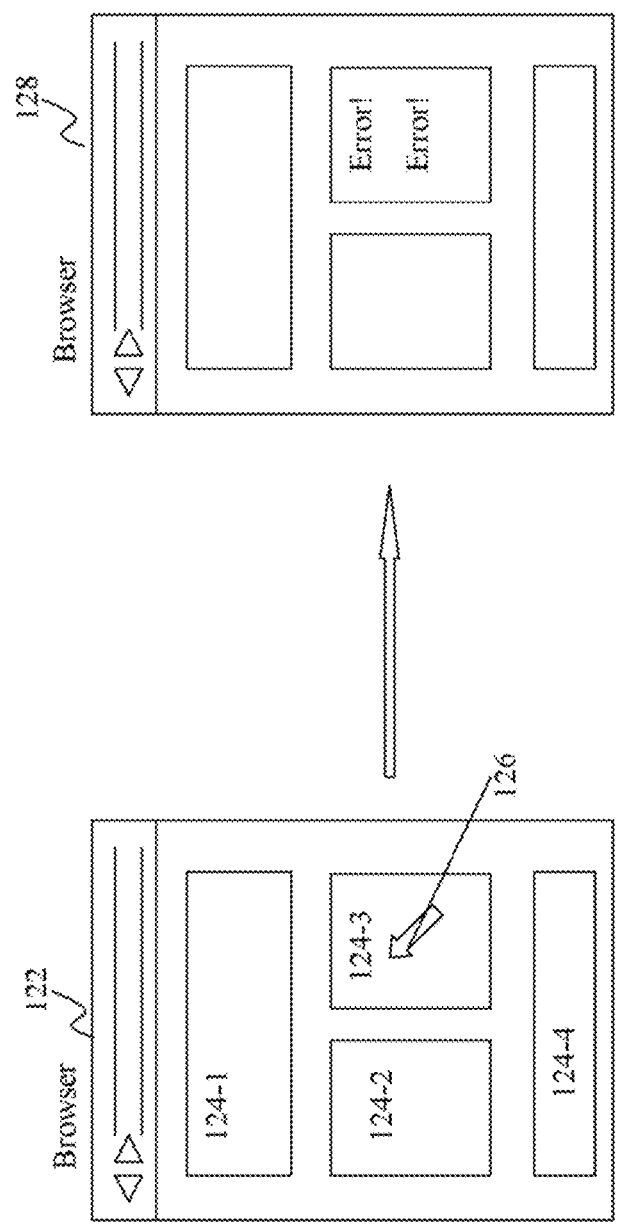
FIG. 3 depicts an exemplary prior art browser interaction.

FIG. 3 depicts an exemplary prior art browser interaction. In FIG. 3, browser 122 displays an application having four view screens 124-1-4. Each view screen represents a part of the application that is either viewable and/or actionable in response to user input. Cursor 126, shown in view screen 124-3 may be clicked or activated by a user. If activation of cursor 126 in view screen 124-3 requests a result from the application that browser 122 cannot execute, view screen 124-3 of browser 122 will show an error state, which is shown by browser 128 of FIG. 3. In certain circumstances, the entire application may crash or cease to operate, simply because a user may have attempted to execute an action in a view screen of the application that is not supported by either the operating system or the device in which the browser resides. For example, if clicking in view screen 124-3 represented an attempt to start a JavaScript application, and the browser, operating system, or device does not support JavaScript, then an error will result, such as that shown in browser 128. Thus, a user is unable to complete their task or use the application to its full capacity.

Figure 4:
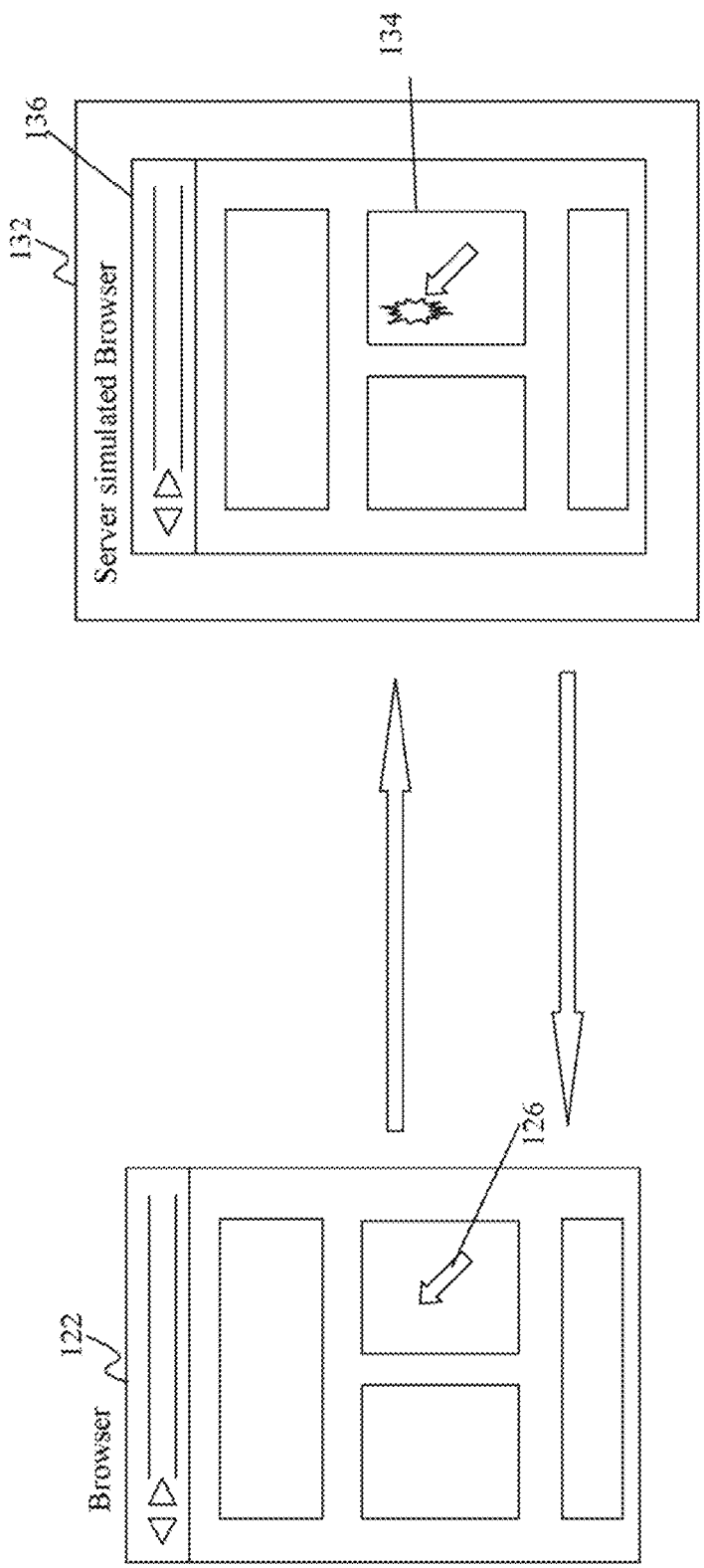
FIG. 4 depicts an exemplary results of a browser interaction with a server browser executing an application in accordance with an embodiment of the present disclosure.

FIG. 4 depicts an exemplary result of a browser interaction with a simulated server browser executing an application in accordance with an embodiment of the present disclosure. Browser 122 is the same as the one shown in FIG. 3, except in this instance, browser 122 is executing an application that has been developed to be interoperable between different device platforms and operating systems, in accordance with the embodiments of the present disclosure. The main difference depicted by FIG. 4 is the result of a user interacting with cursor 126. When a user activates cursor 126, even if browser 122 is unable to produce a response due to incompatibility or a problem with its operating system or device, browser 122 is able to send the user instruction representing an activation of cursor 126 to server 132. Server 132 may host or run a hosted version of the same application, and carry out the user instruction, as shown in view screen 134 of simulated browser 136. The result of the user instruction may be transmitted back to browser 122 and shown within the corresponding view screen of browser 122. Thus, even if browser 122 itself, or its operating system or device, is incapable of producing a response to the user interaction with cursor 126, browser 122 may contact server 132 to produce the desired result. Server 132 may transmit a view screen showing the exact results to browser 122 so a user of browser 122 can continue using the application without realizing that the application may have suffered from compatibility issues when executed at a client browser.

Figure 5:
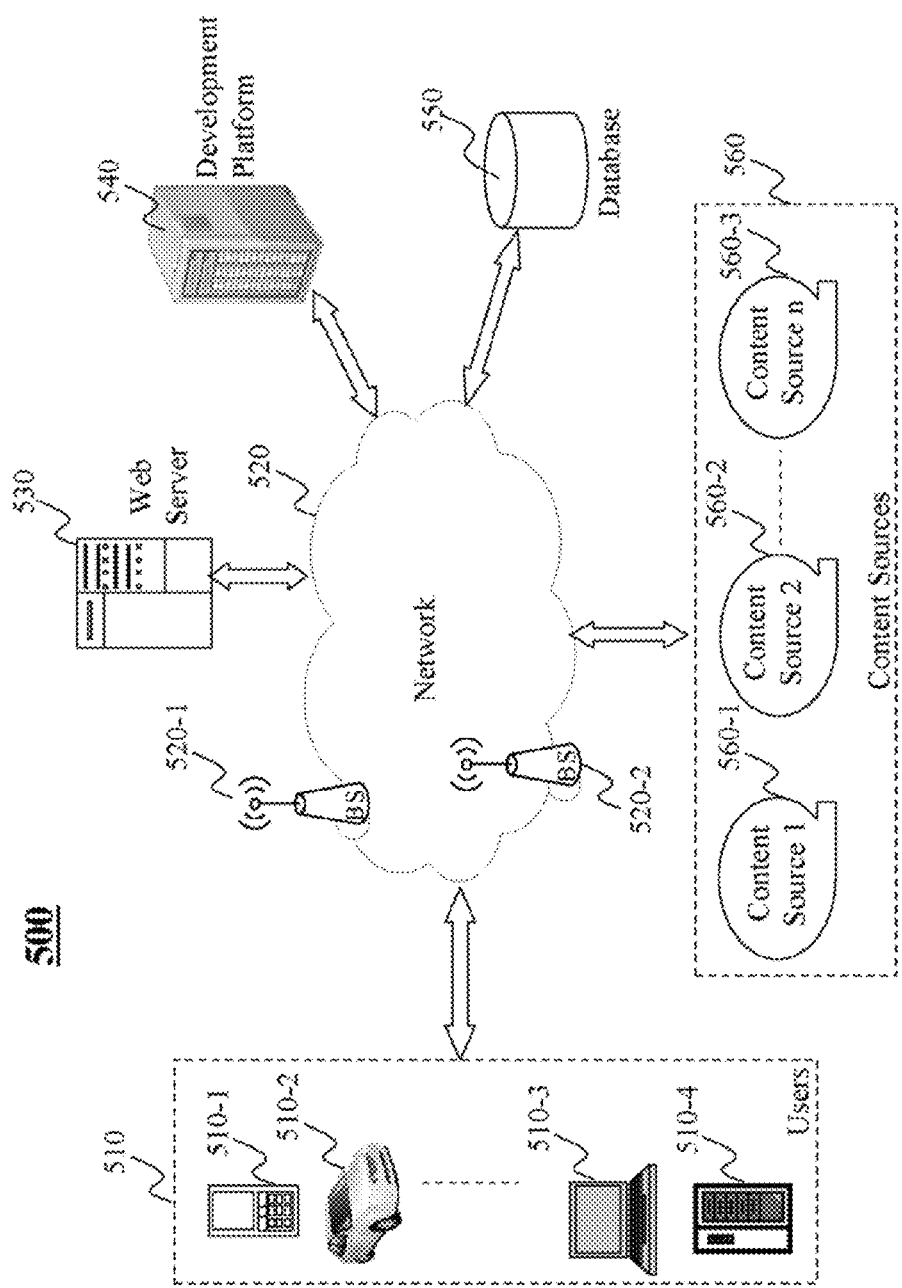
FIG. 5 is a high level depiction of an exemplary system 500 in which a development platform is deployed to provide development and hosting of applications that are interoperable between different device platforms and operating systems.

FIG. 5 is a high level depiction of an exemplary system 500 in which a development platform is deployed to provide development and hosting of applications that are interoperable between different device platforms and operating systems, in accordance with an embodiment of the present disclosure. Exemplary system 500 includes users 510, network 520, web server 530, content sources 560, development platform 540, and a database 550. Network 520 can be a single network or a combination of different networks. For example, a network may be a local area network (LAN), a wide area network (WAN), a public network, a private network, a proprietary network, a Public Telephone Switched Network (PTSN), the Internet, a wireless network, a virtual network, or any combination thereof. A network may also include various network access points, e.g., wired or wireless access points such as base stations or Internet exchange points 520-1, . . . , 520-2, through which a data source may connect to in order to transmit information via the network.

Users 510 may be of different types such as users connected to the network via desktop connections (510-4), users connecting to the network via wireless connections such as through a laptop (510-3), a handheld device (510-1), or a built-in device in a motor vehicle (510-2). A user may run applications provided by web server 530, development platform 540, or any of content sources 560. Thus, applications may be provided from web server 530, development platform 540, or any of content sources 560 through network 520. Once a user is running an application on their device, user may send instructions or requests via the application to web server 530, development platform 540, or any of content sources 560 through network 520. The application may also independently communicate with web server 530, development platform 540, or any of content sources 560 through network 520 as needed to ensure that the application can execute properly.

For example, an application that is interoperable across different platforms and operating systems may be provided to any of users 510 by web server 530, development platform 540, or any of content sources 560 through network 520. The application may be developed at development platform 540 but may also be deployed through any of the aforementioned components. The application may also be hosted by development platform 540 so that the entire application is executed remotely, with all results of user interactions with the application provided to the users 510.

The content sources 560 include multiple content sources 560-1, 560-2, . . . , 560-3. A content source may correspond to a web page host corresponding to an entity, whether an individual, a business, or an organization such as the USPTO represented by USPTO.gov, a content provider such as Yahoo.com, or a content feed source such as Twitter or blog pages. It is understood that any of these content sources may store and host applications that have been developed using development platform 540 in accordance with an embodiment of the present disclosure. A content source may also include, for example, an application store that provides applications to personal computers, laptops, or mobile devices. Web server 530 and development platform 540 may access information from any of content sources 560 and rely on such information to respond to application requests and vice versa. Development platform 540 may also access additional information, via network 520, stored in database 550, which may contain modules and/or application tools for developing applications.

In exemplary system 500, an application is developed at development platform 540. The application is developed such that the application is interoperable across different device platforms and operating systems. Additionally, the application is developed such that if the application is one requiring a hybrid client device and server runtime, the application may execute on its own at a client or user device independent of the device's connection to a server over a network. The application is also developed so that it may adaptively utilize the resources of a server if a server is better suited to execute certain aspects of the application or the entire application. Finally, the application is developed so that it may be hosted completely at a server, which simply provides response to application user input to a user or client device, while the server carries out all instructions and requests received by the application via user input.

The application need only be developed once and the same application may be deployed across network 520 to any of users 510. The application may be deployed to users 510 from any of web server 530, development platform 540, or content sources 560.

In an embodiment, the application is deployed to user 510-1 using a mobile device. If, for example, user 510-1 of the mobile device enters an area of limited or no mobile broadband connectivity, the application is able to continue executing even though the application cannot establish a connection with a web server or content source from which it is deployed.

In another embodiment, the application is deployed to user 510-3 using a laptop that is incompatible with the application because the laptop is not capable of supporting JavaScript. However, development platform 540, from which the application is deployed, may host the application and carry out any requests of user 510-3 at their laptop. Development platform 540 provides user 510-3 responses to user inputs of the application that is viewable and actionable by user 510-3 so that user 510-3 does not notice any difference or suffer any consequence from their laptop being incompatible with the application.

Figure 6:
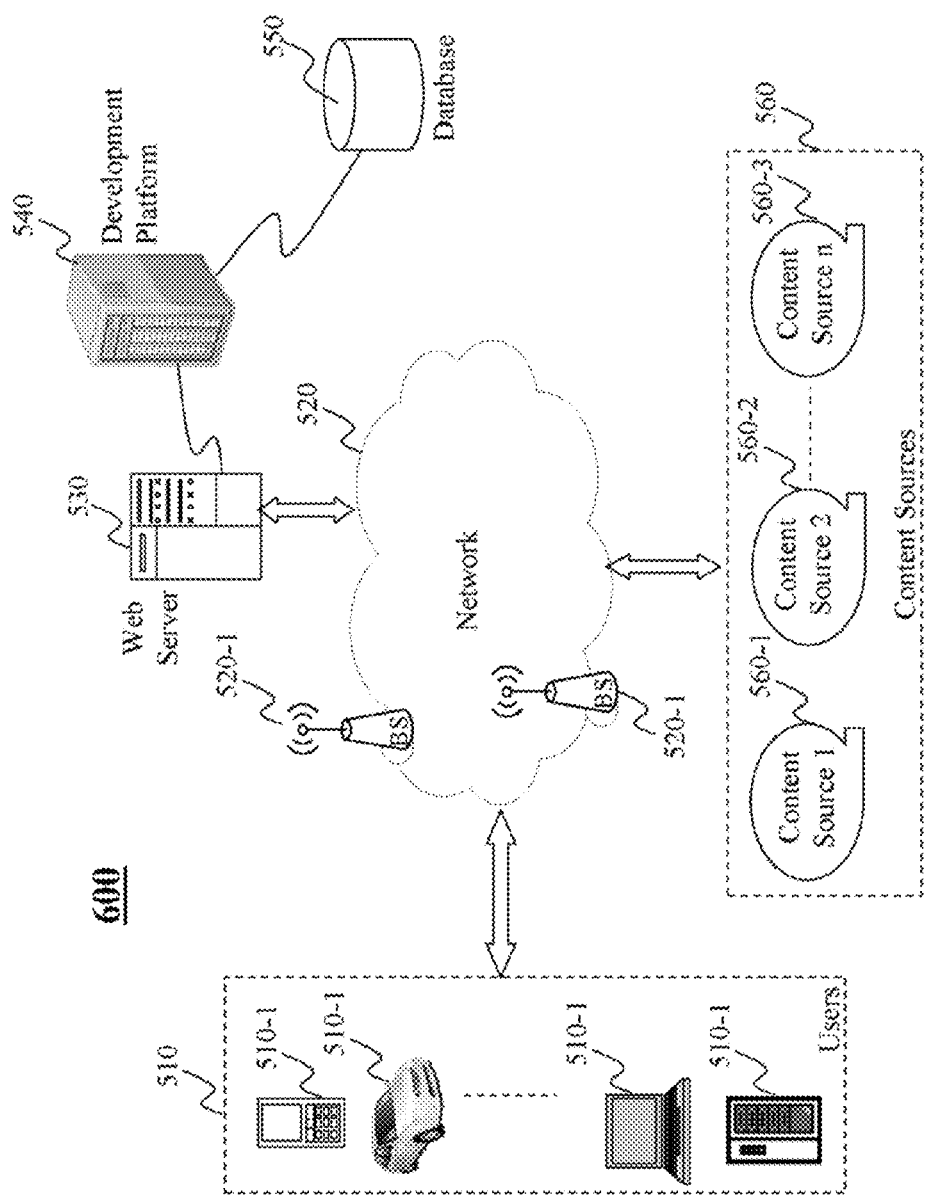
FIG. 6 is a high level depiction of an exemplary system 600 in which a development platform is employed to provide and host applications that are interoperable between different device platforms and operating systems, in accordance with an embodiment of the present disclosure.

FIG. 6 is a high level depiction of an exemplary system 600 in which a development platform is deployed to provide development and hosting of applications that are interoperable between different device platforms and operating systems, in accordance with an embodiment of the present disclosure. In this embodiment, development platform 540 serves as a backend system of web server 530. All communication to and from development platform 540 are sent and received through web server 530.

Figure 7:
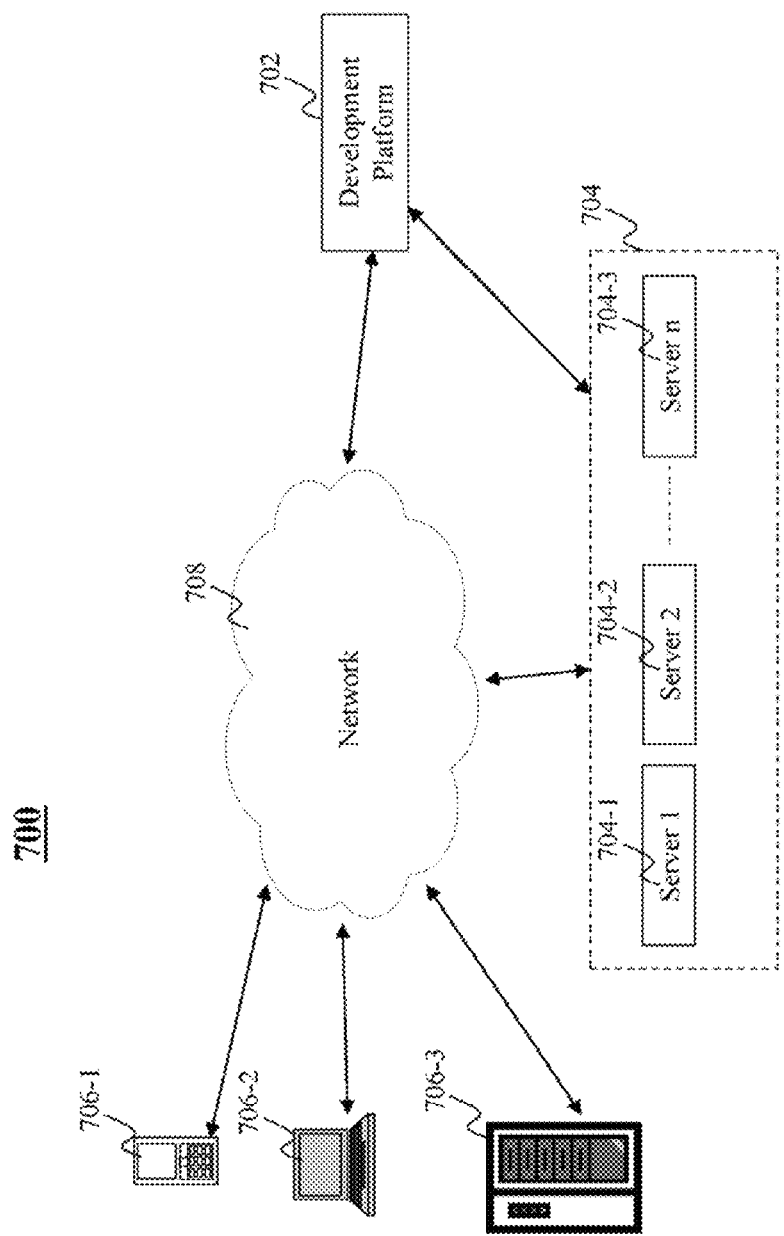
FIG. 7 is a high level depiction of an exemplary system 700 in which development platform 702 directs distributed hosting of applications, in accordance with an embodiment of the present disclosure.

FIG. 7 is a high level depiction of an exemplary system 700 in which development platform 702 directs distributed hosting of applications, in accordance with an embodiment of the present disclosure. Development platform 702 is a platform that may be used to develop applications that are interoperable across different device platforms. Applications developed by development platform 702 may be deployed to any of servers 704, which then host the applications that are eventually distributed for use by devices 706 over network 708. For example, a developer develops an application at development platform 702. The completed application is deployed to server 704-1. Server 704-1 is then responsible for deploying the application to any of devices 706 over network 708 for usage.

Figure 8:
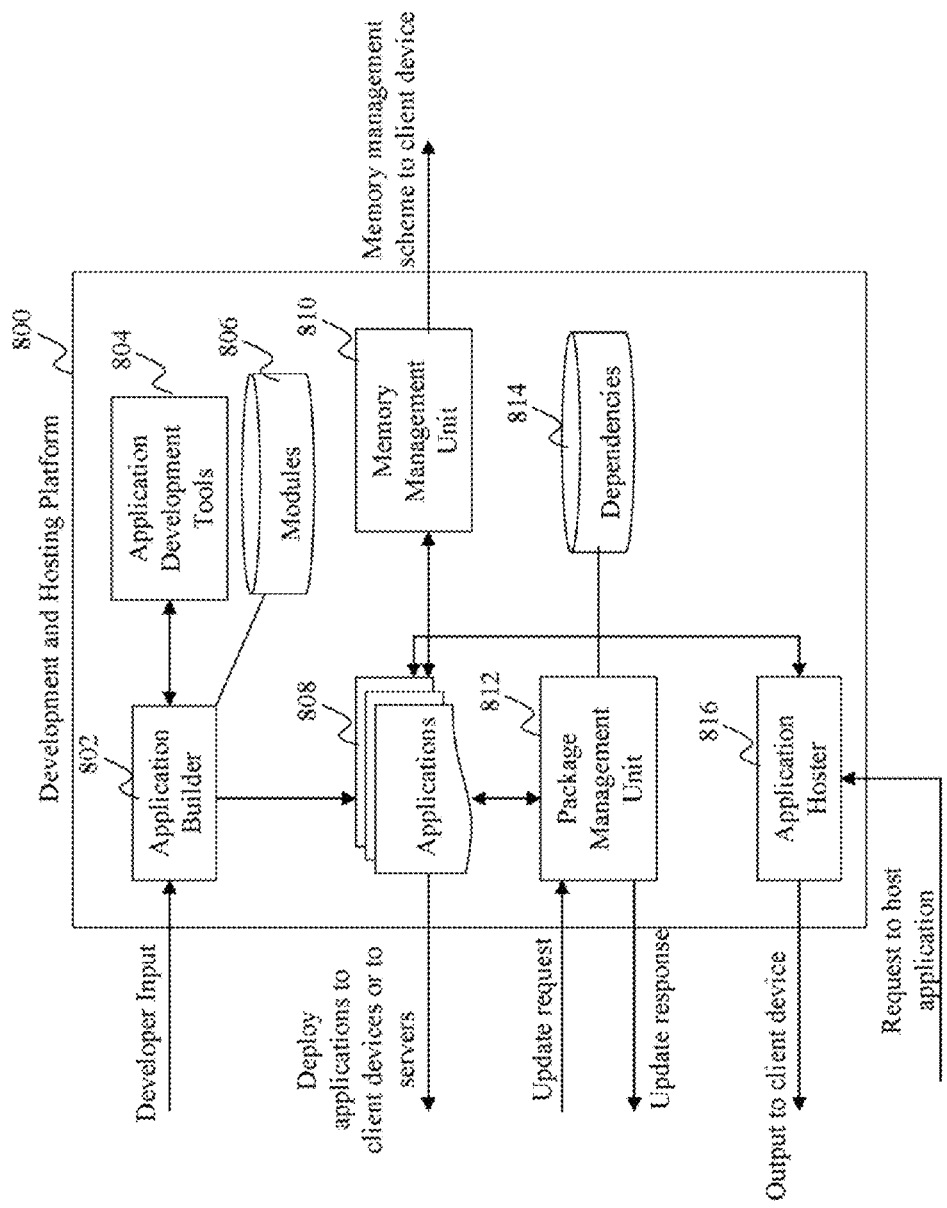
FIG. 8 is a high level depiction of an exemplary development and hosting platform in accordance with an embodiment of the present disclosure.

FIG. 8 depicts a high level depiction of an exemplary development and hosting platform in accordance with an embodiment of the present disclosure. Development and hosting platform 800 includes an application builder 802, application development tools 804, modules database 806, applications 808, memory management unit 810, package management unit 812, dependencies database 814, and application hoster 816. Application builder 802, receives developer input, and generates applications 808. Each application that is generated includes at least one module that may be retrieved from, for example, modules database 806. Application development tools 804 are used to assist in developing the applications.

All applications that are developed are based on a browser based or scripting based application framework. In an embodiment, this browser based or scripting based application framework is a JavaScript application framework. Thus, in an embodiment, the applications are written or coded completely using JavaScript. The JavaScript application framework facilitates development of applications that can be executed in both client-side and server-side environments. The JavaScript application framework ensures that developers using application builder 802 do not have to write a different set of code for a server backend and a browser frontend. The JavaScript application framework also ensures that even if a browser attempting to execute the application is not capable of running JavaScript applications or is not compatible with JavaScript, the application will adapt and execute instead at a server side. Since all applications may be JavaScript based, a single code base may be used. A module/widget application framework is also used along with the JavaScript application platform by application builder 802 to develop applications that may be deployed to devices. The application framework facilitates the development of transportable code between client devices or browsers at client devices and server. The application framework provides a software architecture pattern that isolates application logic for a user from a user interface, thus permitting independent development, testing, and maintenance of each.

Thus, as discussed above, each application generated by application builder 802 allows developers to develop one application that is interoperable between different device platforms and operating systems. The same single application may be deployed to a variety of devices and be executable on all of them. The applications may be deployed to any device that is capable of running or having a browser environment capable of executing the applications.

Application development tools 804 facilitates continuous integration of tasks for developers using application builder 802 to develop applications. The development of applications may be monitored, and output from the applications reviewed. Application development tools 804 may also be used in conjunction with application builder 802 to add device specific presentation capabilities to applications.

Memory management unit 810 may be used to add yet another level of functionality to the applications developed by application builder 802. Before, or after deployment of an application to a device, memory management unit 810 may detect a current or expected memory usage of the device. If the application will require more memory than is available at the device, memory management unit 810 may deploy a memory management scheme to the device. The memory management scheme ensures that the device will always have enough memory to support execution of the application. This prevents the application from encountering memory related errors.

Package management unit 812 is responsible for ensuring that deployed applications are kept updated. Deployed applications may periodically or at user request, submit an update request to package management unit 812 to serve updated packages to the applications. The update request includes a list of currently installed and additional packages it wants to acquire. Package management unit 812 checks the package list and obtains package dependencies from dependencies database 814. Package dependencies ensure that the client device receives not only the packages it requests, but also additional, and dependent packages that should be served to ensure that the application is fully upgraded and able to operate. Package management unit 812 is then able to deploy or serve all updated and required packages to the client device autonomously.

Package management unit 812 may also be responsible for ensuring that the correct packages are delivered to a client device based on the client device type. For example, if a client device is a smartphone operating on iOS, package management unit 812, ensures that the packages received by the client device are compliant with iOS and are optimized such that the application will execute taking full advantage of the capabilities of the client device.

In another embodiment, package management unit 812 may facilitate retrieval of previews based on older versions of applications from a client device. For example, if a client device is running an older version of an application, the server may need to determine a more appropriate package corresponding to an older version of the application. The client device may submit a request to package management unit 812 for packages it wishes to preview. Package management unit 812 determines the client device is executing an older version of an application and searches for files which have been tagged to represent their association with a particular version of the application. Once package management unit 812 finds the appropriate files, it responds to the client device with the location of the files so that the client device may retrieve them.

In another embodiment, package management unit 812 facilitates server side caching. Server side caching involves package management unit 812 making an independent determination of which packages are required at a client device. This allows package management unit 812 to adaptively cache certain packages to ensure that required packages are deployed in an efficient manner to prevent any slow down of application execution. Intermediate computations may be cached to aid in future package requests as well.

Application hoster 816 is a hosting environment for all applications developed by application builder 802. More specifically, application hoster 816 is a server-side JavaScript hosting environment for applications, allowing application developers to deploy, un-deploy, and manage multiple versions of applications. Applications deployed from application hoster 816 are able to be executed on any device platform due to the platform agnostic nature of the applications. Application hoster 816 provides hosting of applications in a network environment. Thus, the servers shown in FIG. 7 are not necessary for hosting developer created applications.

Figure 9:
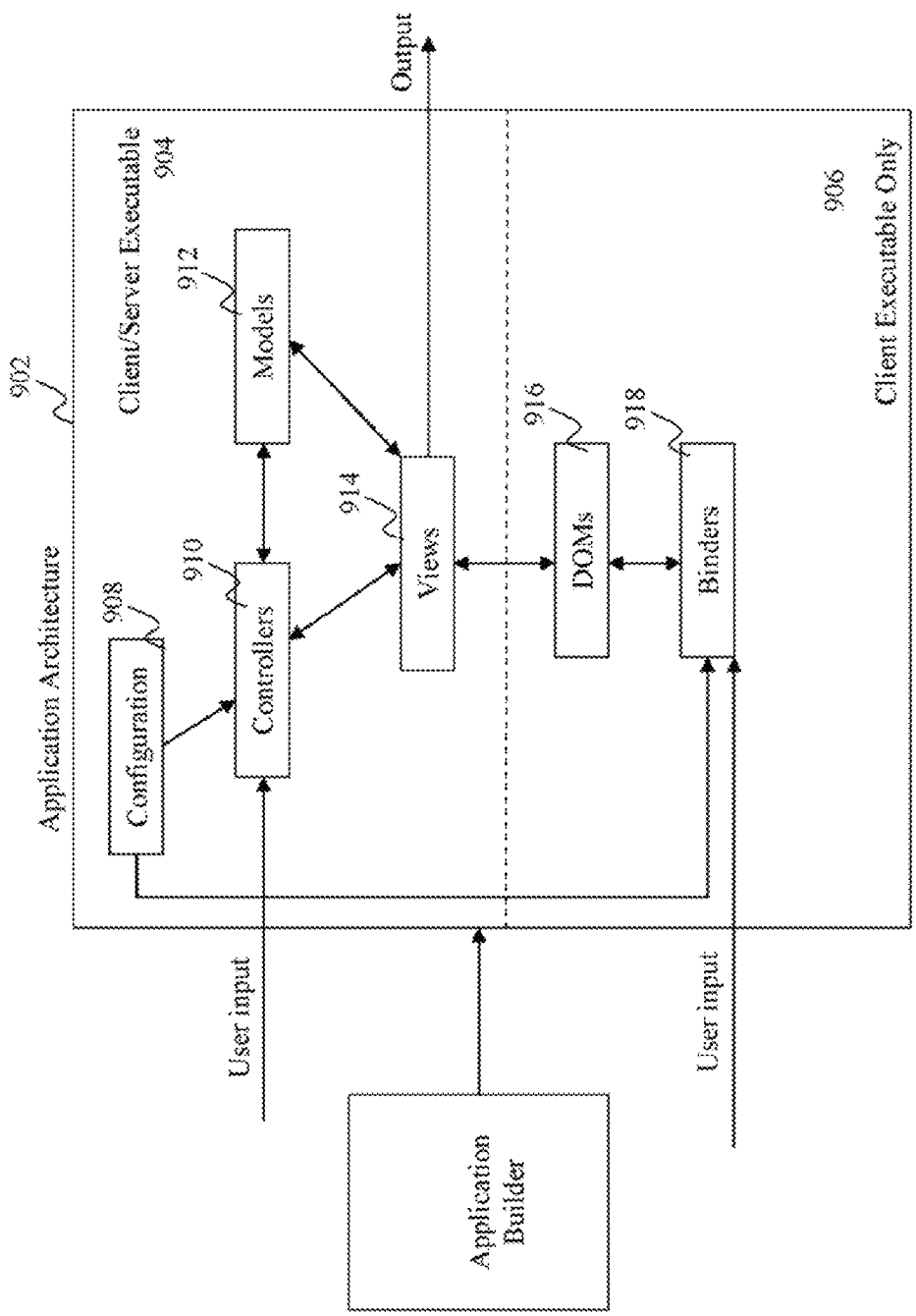
FIG. 9 depicts an exemplary application MVC architecture in accordance with an embodiment of the present disclosure.

FIG. 9 depicts an exemplary application architecture in accordance with an embodiment of the present disclosure. Application architecture 902 represents the application framework used by application builder 802 to develop applications. Since applications developed using application builder 802 may be written completely in a browser oriented language or a scripting language. For example, the language may be JavaScript. It follows that both client components and server components of any application developed using application builder 802 are written in JavaScript as well. This facilitates the execution of applications on both a client device or browser at a client device, or at a server. FIG. 9 depicts elements of an application architecture 902 and corresponding components.

Application architecture 902 includes client/server executable components 904 and client executable components 906. Client/server executable components 904 include configuration files 908, controllers 910, models 912, and views 914. Client executable components 906 includes document object models (DOMs) 916 and binders 918.

Configuration files 908 define relationships between code components, assets, routing paths, and defaults. When an application is first created by a developer using application builder 802, configuration files are generated. Controllers 910 react to user input and initiate responses to user input by calling models 912. For example, a particular controller associated with a particular model may receive an indication of a user input and instruct a corresponding model and corresponding view from views 914 to perform actions based on the user input. Models 912 manage the behavior and data of an application domain, and responds to requests for information about its state (from the views), and responds to instructions to change state (from the controllers). More specifically, models 912 notify views 914 about changes in information so that views 914 can react accordingly. Views 914 renders models 912 into forms suitable for interaction, typically in the form of a user interface element. Multiple views may exist for a single model. Views 914 represent what a user of an application sees on a device or browser.

For an application operating at a server side or within a browser at a client device, client requests for data, or user input, is sent to controllers 910, which fetch data from models 912 to pass to views 914. The appropriate output from the views may then be passed back to the client device.

DOMs 916 assist in rendering views. DOMs 916 are conventions that represent and interact with objects such as views, models, and controllers. DOMs 916 and binders 918 are deployed to a client device only since they are only executable at a client device. Binders 918 interact with event handlers based on user interface input to an application from a user. The event handlers interact with the DOMs 916 which in turn invoke functions in the controllers 910 to update content in views 914. Since DOMs 916 and binders 918 are only client executable, binders receive user input in the form of user interface interactions. The binders 918 interact with the DOMs 916, which communicates with the controllers to facilitate client requests.

The user input to controllers 910 at a server side occurs when a client device binders 918 cannot interact with controllers 910 via DOMs 916. This causes controllers 910 at a server side to run remote network requests that are sent to models 912. The results from models 912 are sent to views 914 to transmit back to the client device for rendering at a client browser.

Figure 10:
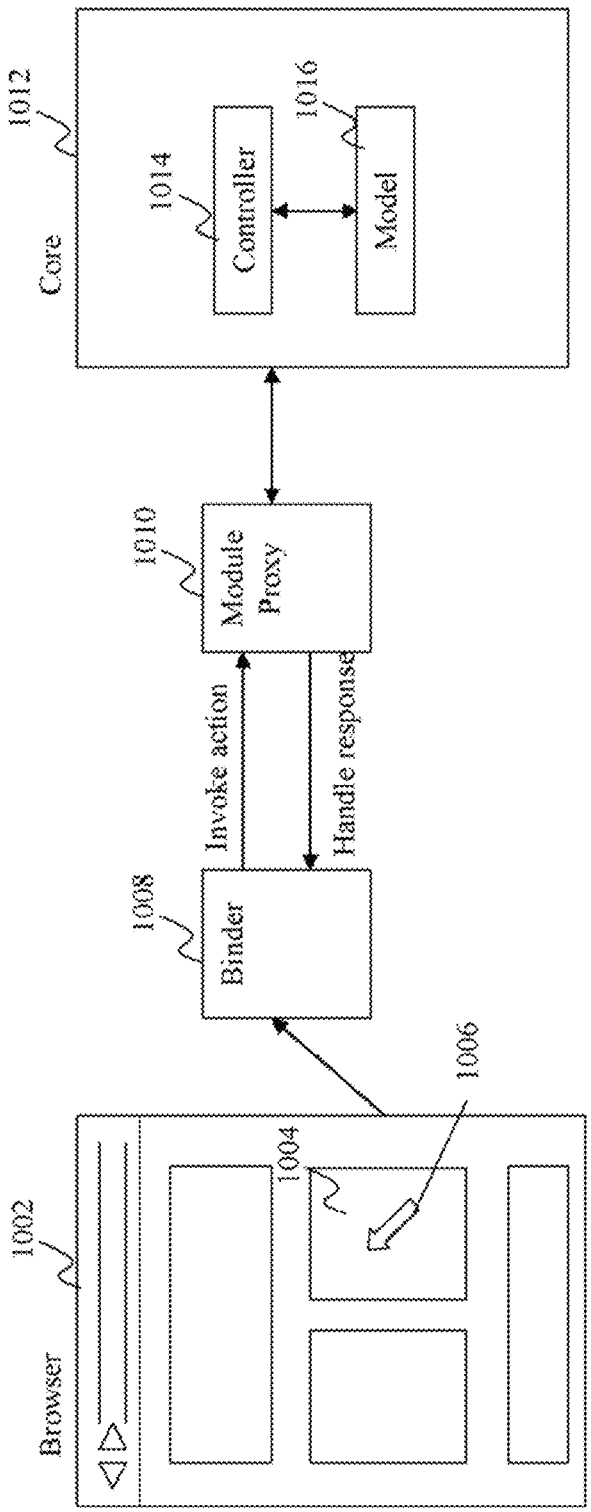
FIG. 10 depicts an exemplary client-side application execution in accordance with an embodiment of the present disclosure.

FIG. 10 depicts an exemplary client-side application execution in accordance with an embodiment of the present disclosure. Browser 1002 represents a client side browser instance running an application in accordance with the embodiments described herein. Upon activation or clicking of view panel 1004 using cursor 1006, an instruction bound to binder 1008 invoke an action corresponding with view panel 1004. The instruction is sent through module proxy 1010, which serves as a conduit for sending requests to Core 1012 of the application. The instruction is transmitted through module proxy 1010 to controller 1014, which executes the instruction at the client side browser based on sending a request for information to model 1016. The response to execution of the instruction at controller 1014 is transmitted through module proxy 1010, back to binder 1008, which interacts with view panel 1004 that will show the appropriate response.

Figure 11:
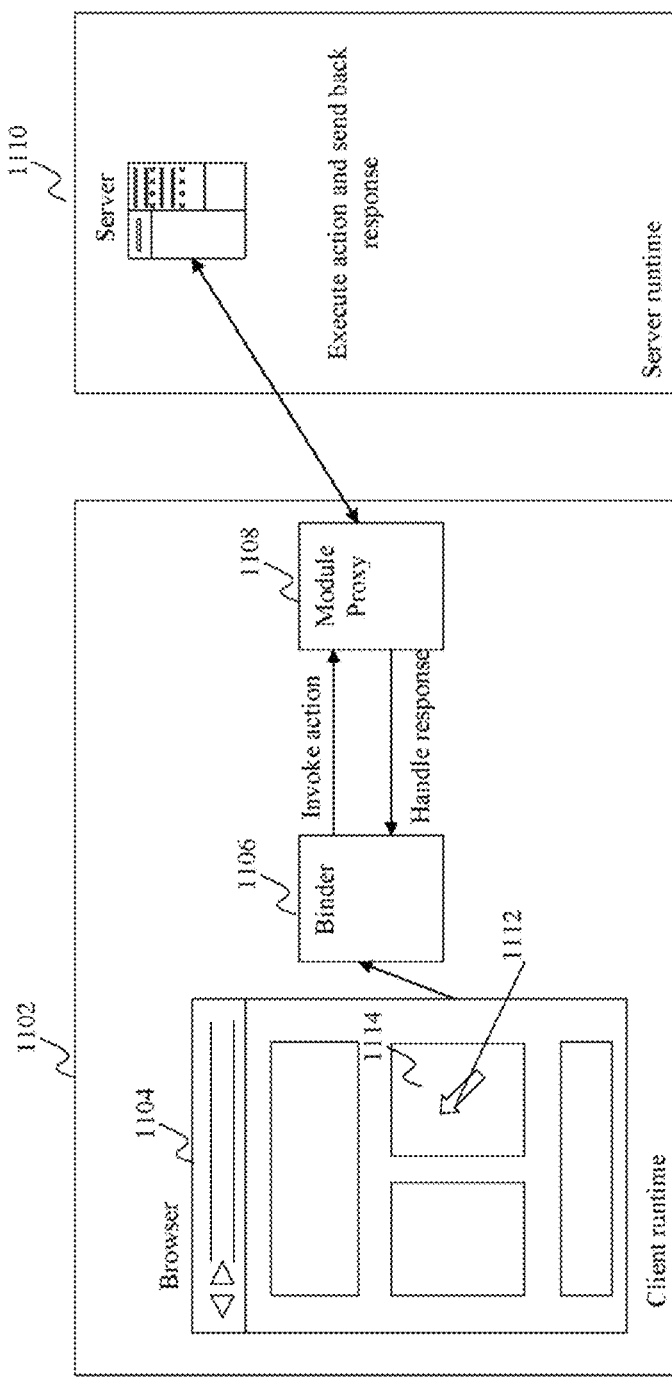
FIG. 11 depicts an exemplary server-side application execution in accordance with an embodiment of the present disclosure.

FIG. 11 depicts an exemplary server-side application execution in accordance with an embodiment of the present disclosure. Client runtime box 1102 shows all interactions between browser 1104, binder 1106, and module proxy 1108 with respect to a client-side execution of an application. Server runtime box 1110 shows a server responding to instructions sent from module proxy 1108. In this particular example, a certain user input interaction based on cursor 1112 in view panel 1114 is unable to be executed at the client side. Thus, an instruction representing the user input interaction is bound to binder 1106. An action is invoked by binder 1106, which sends the instruction through module proxy 1108, which serves as a conduit for sending requests to different servers that may be hosting or executing the application. Server 1116 receives the instruction, executes the action at the application executing at the server side and transmits a response back through module proxy 1108 to binder 1106, which interacts with view panel 1114 to show the appropriate response to the user input interaction or instruction.

Figure 12:
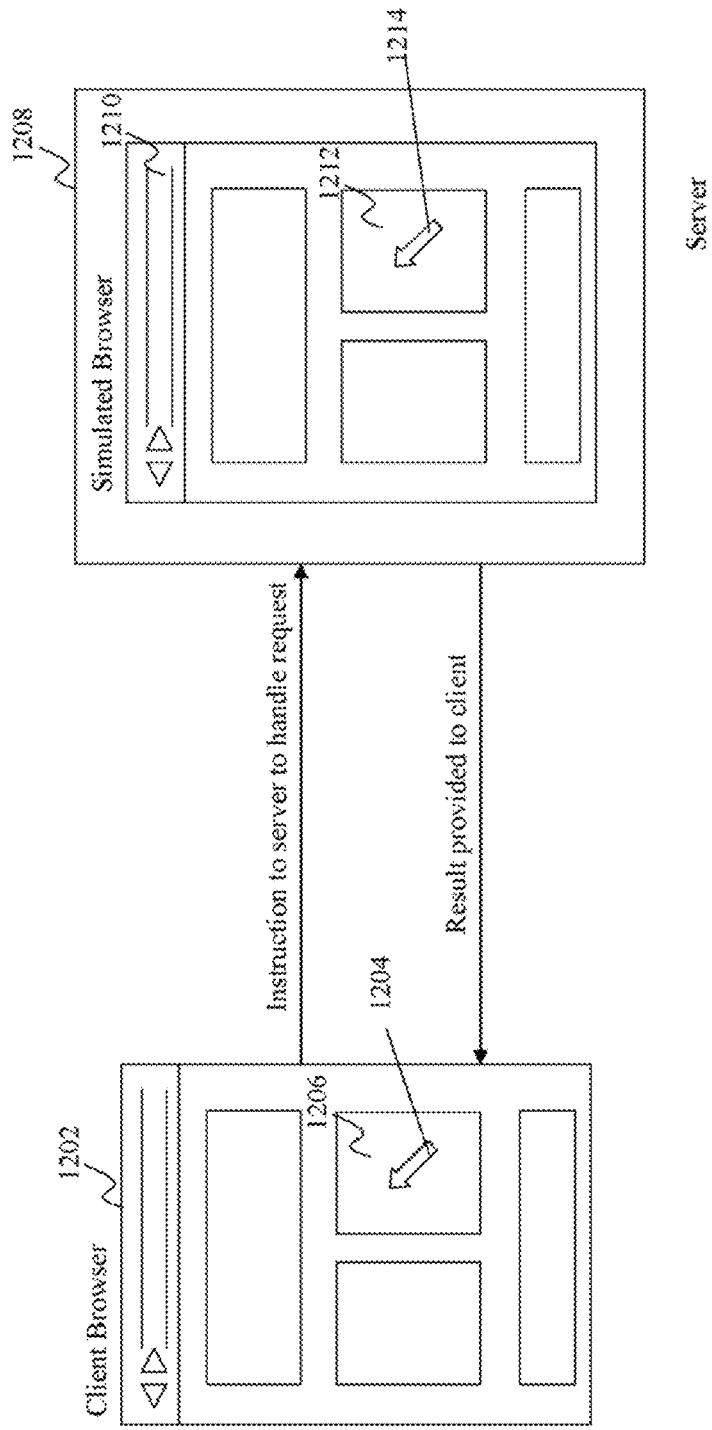
FIG. 12 depicts an exemplary view of a client browser running an application at a client, and a simulated browser at a server running the same application, in accordance with an embodiment of the present disclosure.

FIG. 12 depicts an exemplary view of a client browser running an application at a client, and a simulated browser at a server running the same application, in accordance with an embodiment of the present disclosure. Client browser 1202 includes a cursor 1204 for receiving user input to a view panel 1206. Since client browser 1202 cannot execute an instruction related to the user input, the instruction is sent to server 1208. Server 1208, which is executing the same application at a server side will execute the instruction sent by the client browser 1202 and provide a response that is viewable within view panel 1206 of client browser 1202. The simulated browser 1210 includes a view panel 1212, as well as simulated cursor 1214 which corresponds to the activities happening at client browser 1202.

Figure 13:
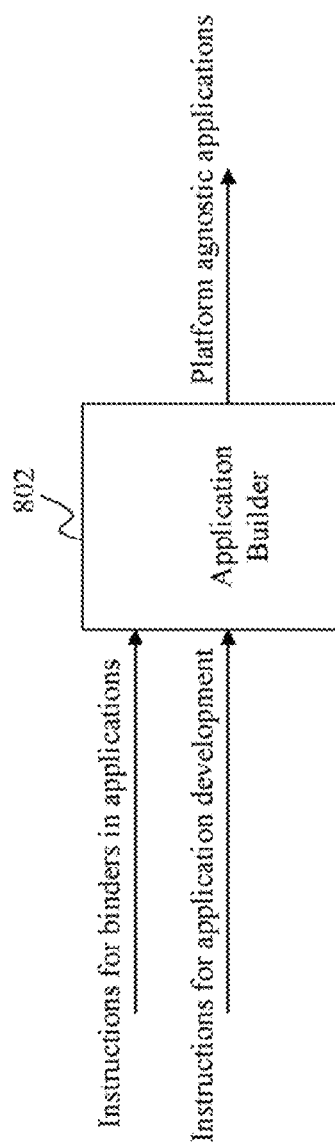
FIG. 13 depicts an exemplary high level system diagram of application builder 802, in accordance with an embodiment of the present disclosure.

FIG. 13 depicts an exemplary high level system diagram of application builder 802, in accordance with an embodiment of the present disclosure. Application builder 802, which is responsible for developing and generating platform independent applications, receives instructions for application development, including application parameters, and modules to include in the application. Application builder 802 also receives instructions for adding binders to the application. Binders, as discussed above, are set by an application developer. The binders dictate which event handlers (tied to user interface inputs) may attach with DOMs that further communicate within the architecture of the application. Taking all of the input into account, as well as using application development tools 804, platform agnostic applications are output from application builder 802. These applications may then be deployed to directly to a client device, deployed for serving through a different server, such as, for example, one linked or associated with a mobile application store, or deployed to application hoster 816 for hosting through a cloud based network.

Figure 14:
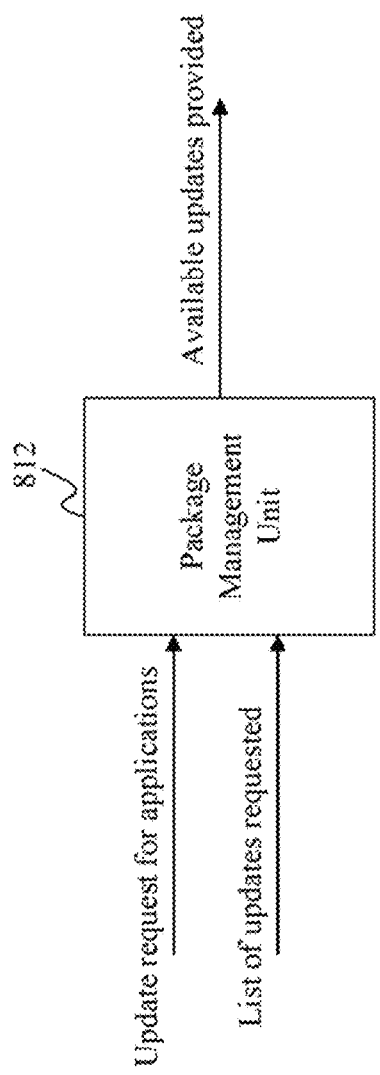
FIG. 14 depicts an exemplary high level system diagram of package management unit 812, in accordance with an embodiment of the present disclosure.

FIG. 14 depicts an exemplary high level system diagram of package management unit 812, in accordance with an embodiment of the present disclosure. Package management unit 812 is responsible for providing updates to applications in the form of packages to keep deployed applications updated. Package management unit 812 receives as input, lists of required packages and currently installed packages. Package management 812 then uses this received input to cross reference a dependencies database to determine what other packages may be required in addition to those required for the requested updates. Once the entire package list is determined by package management unit 812, the updates in the form of packages are deployed to the applications. This ensures that applications will to the extent possible reflect the latest version.

In another embodiment, package management unit 812 may receive an update request for a past version of an application. In this scenario, package management unit searches for a corresponding past update package that is compatible with the update request, and provides the relevant packages to the application as required.

Figure 15:
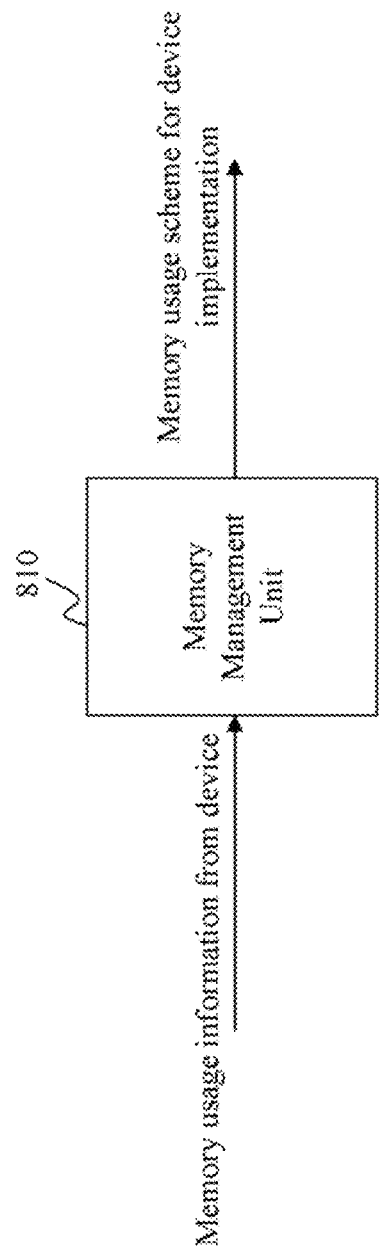
FIG. 15 depicts an exemplary high level system diagram of memory management unit 810, in accordance with an embodiment of the present disclosure.

FIG. 15 depicts an exemplary high level system diagram of memory management unit 810, in accordance with an embodiment of the present disclosure. Memory management unit 810 receives as input, memory usage information from a device that an application has been deployed or transmitted to. Prior to execution of the application at the device, memory management unit 810 receives memory usage information and analyzes the memory usage information. If the memory usage information shows that the device does not have enough free memory to execute the application, memory management unit determines a memory usage scheme for the device to ensure that the application may be executed. The memory usage scheme is then transmitted to the device by memory management unit 810 for implementation at the device.

Figure 16:
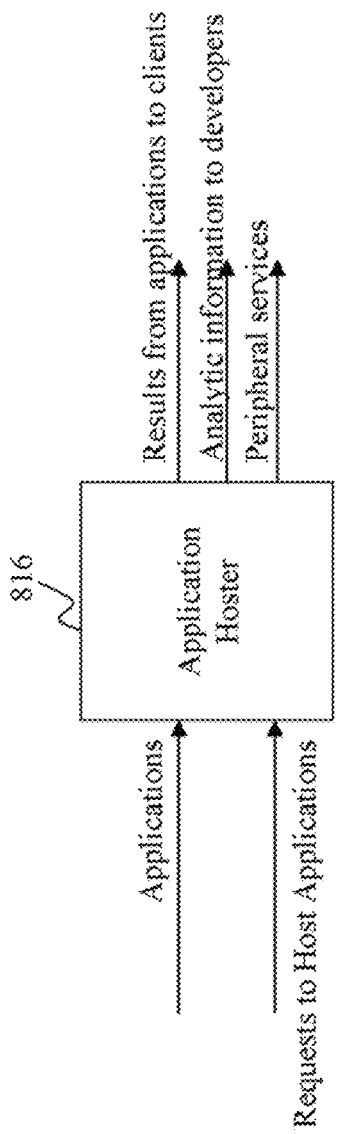
FIG. 16 depicts an exemplary high level system diagram of application hoster 816, in accordance with an embodiment of the present disclosure.

FIG. 16 depicts an exemplary high level system diagram of application hoster 816, in accordance with an embodiment of the present disclosure. Application hoster 816 receives applications developed by application builder 802. Application hoster 816 can then host these applications and deploy them as necessary, while acting as a server for the applications. Application hoster 816 may also receive requests from client devices or other sources, such as developers to host applications. Application hoster 816, while hosting applications, can provide results of executing instructions provided to the hosted applications, to client devices. Also, as will be discussed in further detail below, application hoster 816 can analyze analytic information relating to deployment and execution of applications. This information may be provided to developers to assist developers in determining how to further develop applications and tweak existing applications. Since application hoster 816 is a hosting platform that hosts applications developed using application builder 802 in a cloud based environment, application hoster 816 may also host peripheral services, such as privacy controls and parental controls. These peripheral services may be deployed with any of the applications hosted by application hoster 816.

Figure 17:
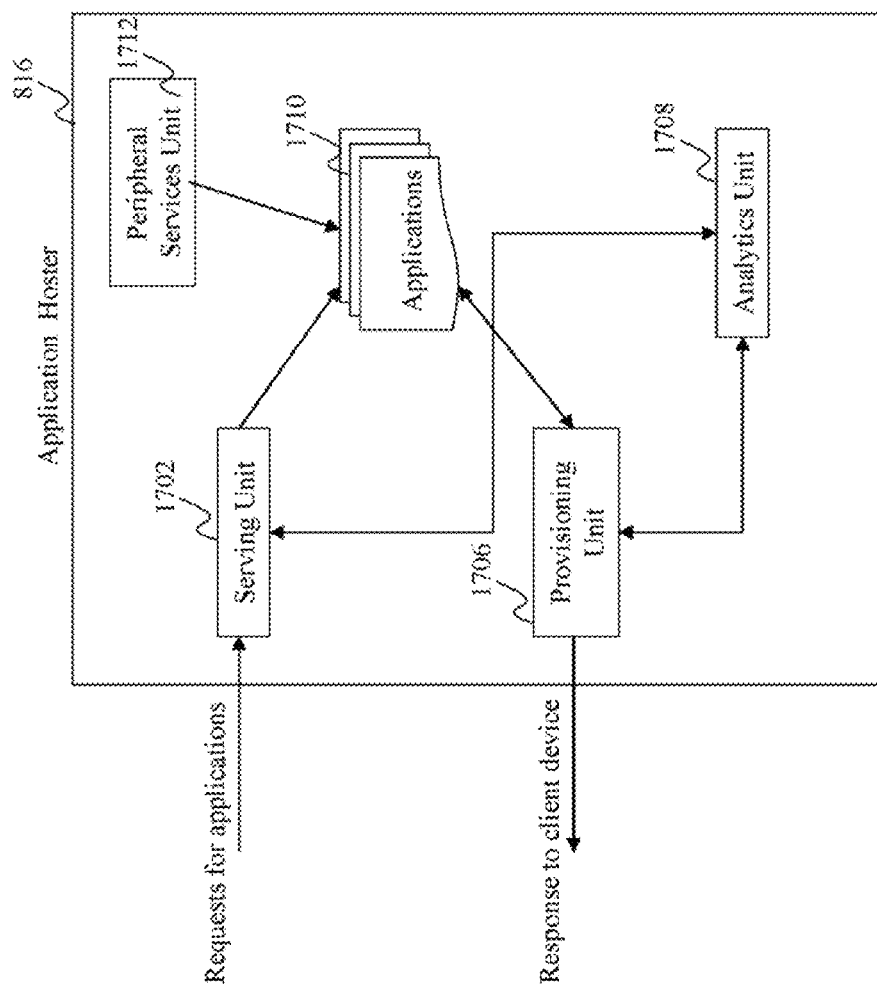
FIG. 17 depicts an exemplary high level system diagram of application hoster 816, in accordance with an embodiment of the present disclosure.

FIG. 17 depicts an exemplary high level system diagram of application hoster 816, in accordance with an embodiment of the present disclosure. Application hoster 816 includes serving unit 1702, provisioning unit 1706, analytics unit 1708, applications 1710, and peripheral services unit 1712. Serving unit 1702 receives requests for applications that have been deployed by application hoster 816. Any requests for applications or to perform particular instructions at a particular application are processed by serving unit 1702 which routes the requests appropriately. Provisioning unit 1706 is responsible for deploying the correct version of applications to client devices, and for transmitting responses to client devices based on instructions received. Since multiple versions of applications exist and may be stored by application hoster 816 (i.e. development application, test application, staging application), application hoster 816 allows developers to deploy different applications that may be hosted, for example, on a distributed network of servers. The distributed network of servers may comprise multiple routers fronted by a hardware load balancer to publish changes to applications as they occur. Analytics unit 1708 may extract metrics from both serving unit 1702 and provisioning unit 1706. These metrics may be packaged as a set of information and provided to developers to assist in their application development efforts.

Peripheral services unit 1712 provides peripheral services such as privacy controls and parental controls to applications deployed by application hoster 816. For example, a hosted application may also receive the benefit of a peripheral service allowing parental controls to be set for the application. If the application were not hosted at application hoster 816, this option would not be available.

Figure 18:
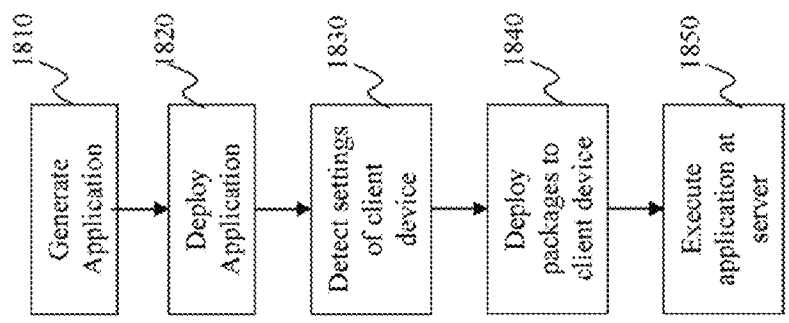
FIG. 18 depicts a flowchart of an exemplary process in which a server, which as server 530 may develop and deploy an application, in accordance with an embodiment of the present disclosure.

FIG. 18 depicts a flowchart of an exemplary process in which a server, such as server 530 may develop and deploy an application, in accordance with an embodiment of the present disclosure. At 1810, an application is generated by server 530. The application is generated by accessing a development and hosting platform capable of generating applications that are capable of being executed in a plurality of different device formats and are interoperable between different device formats and operating systems. This development and hosting platform may be, for example, platform 540, or development and hosting platform 802. Generation of the application includes coding of the application to include a JavaScript application framework that facilitates both client side and server side execution of the application. The JavaScript application framework includes binders allowing a client device execution of the application to interface with controllers at a server side execution of the application.

At 1820, the application is deployed to a client device for execution at the client device. Deployment of the application may take place through server 530. However, the deployment may also be in response to an instruction transmitted from one of content sources 560 to server 530 to deploy the application to a client device. For example, a user of a device may visit content source 560-1, to select an application for download or access. Content source 560-1 in turn sends an instruction to server 530 to deploy the application to the client device. Deploying the application may also involve detecting settings of the client device at 1830. At 1840, in response to detecting the settings, packages may be deployed to the client device which are integrated to the application in order to customize the application for the client device. For example, if the client device is an iOS smartphone, certain customizations may be required to ensure that the application is viewable and executable within the confines of iOS specific settings and configurations.

At 1850, execution of the application may be initiated at the server. The application is initiated at the server in anticipation of the server being called upon to respond to user instructions to the application at the client device that the client device.

Figure 19:
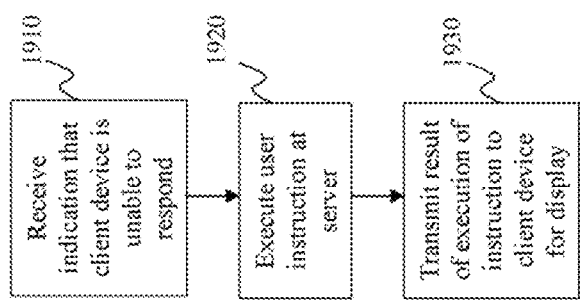
FIG. 19 depicts a flowchart of an exemplary process in which a server, such as server 530 may develop and deploy an application, in accordance with an embodiment of the present disclosure.

FIG. 19 depicts a flowchart of an exemplary process in which a server, such as server 530 may develop and deploy an application, in accordance with an embodiment of the present disclosure. At 1910, server 530 receives an indication that the client device is unable to respond to a user instruction to the application. At 1920, the user instruction is executed at the same application executing at the server. At 1930, a result of the execution of the user instruction is transmitted to the client device for display at the client device.

Figure 20:
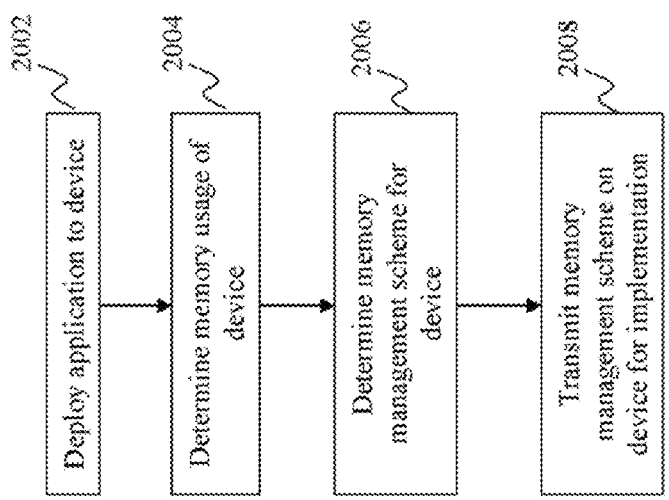
FIG. 20 depicts a flowchart of an exemplary process in which a development and hosting platform may deploy applications, in accordance with an embodiment of the present disclosure.

FIG. 20 depicts a flowchart of an exemplary process in which a development and hosting platform such as development and hosting platform 802 may deploy applications, in accordance with an embodiment of the present disclosure. At 2002, an application is deployed to a client device. At 2004, current memory usage of the client device is determined. Based upon the current memory usage of the client device, and based upon whether the client device has the ability to allocate enough memory to support execution of the application, a memory management scheme is determined for the client device at 2006. The memory management scheme may then be transmitted to the client device at 2008 for implementation.

Figure 21:
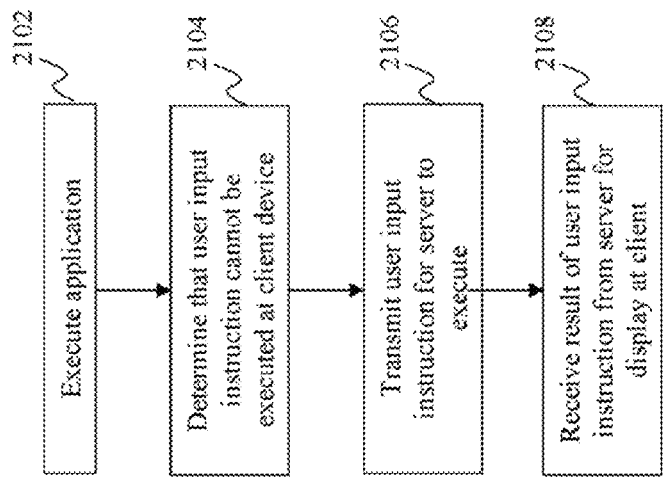
FIG. 21 depicts a flowchart of an exemplary process in which a user 510 of a device can execute an application that is interoperable across a plurality of device platforms, in accordance with an embodiment of the present disclosure.

FIG. 21 depicts a flowchart of an exemplary process in which a user 510 of a device can execute an application that is interoperable across a plurality of device platforms, in accordance with an embodiment of the present disclosure. At 2102, the application is executed by the user 510 of a device. The application may then determine that some received user input instruction representing an input to an application user interface cannot be executed at the client device used by the user, at 2104. This prompts the application, at 2106, to transmit the user input to a server that is executing the application for execution at the server. At 2108, a result of the user input instruction is received from the server at the client for display at the client device.

Figure 22:
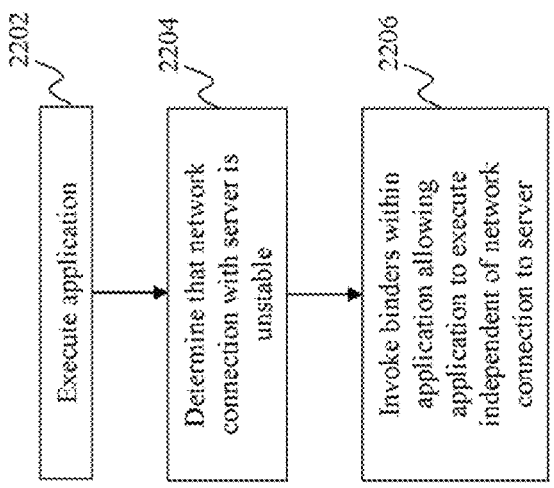
FIG. 22 depicts a flowchart of an exemplary process in which a user 510 of a device can execute an application that is interoperable across a plurality of device platforms, in accordance with an embodiment of the present disclosure.

FIG. 22 depicts a flowchart of an exemplary process in which a user 510 of a device can execute an application that is interoperable across a plurality of device platforms, in accordance with an embodiment of the present disclosure. At 2202, the application is executed by the user 510 of a device. At 2204, a determination may be made that a network connection with a server hosting the application is unstable. Based on this determination, at 2206, the application may invoke binders within the application that allow the application to continue to execute seamlessly and locally at the client independent of a network connection with the server. This seamless execution is made possible by application hoster 816 which can selective choose, based on the application and network conditions, certain portions of data to cache at a client device, which will allow the application to continue executing even though a network connection with a server may technically be necessary.

To implement the embodiments set forth herein, computer hardware platforms may be used as hardware platform(s) for one or more of the elements described herein (e.g., application builder 802, application hoster 816, memory management unit 810, and package management unit 812). The hardware elements, operating systems and programming languages of such computer hardware platforms are conventional in nature, and it is presumed that those skilled in the art are adequately familiar therewith to adapt those technologies to implement any of the elements described herein. A computer with user interface elements may be used to implement a personal computer (PC) or other type of workstation or terminal device, although a computer may also act as a server if appropriately programmed. It is believed that those skilled in the art are familiar with the structure, programming, and general operation of such computer equipment, and as a result the drawings are self-explanatory.

Figure 23:
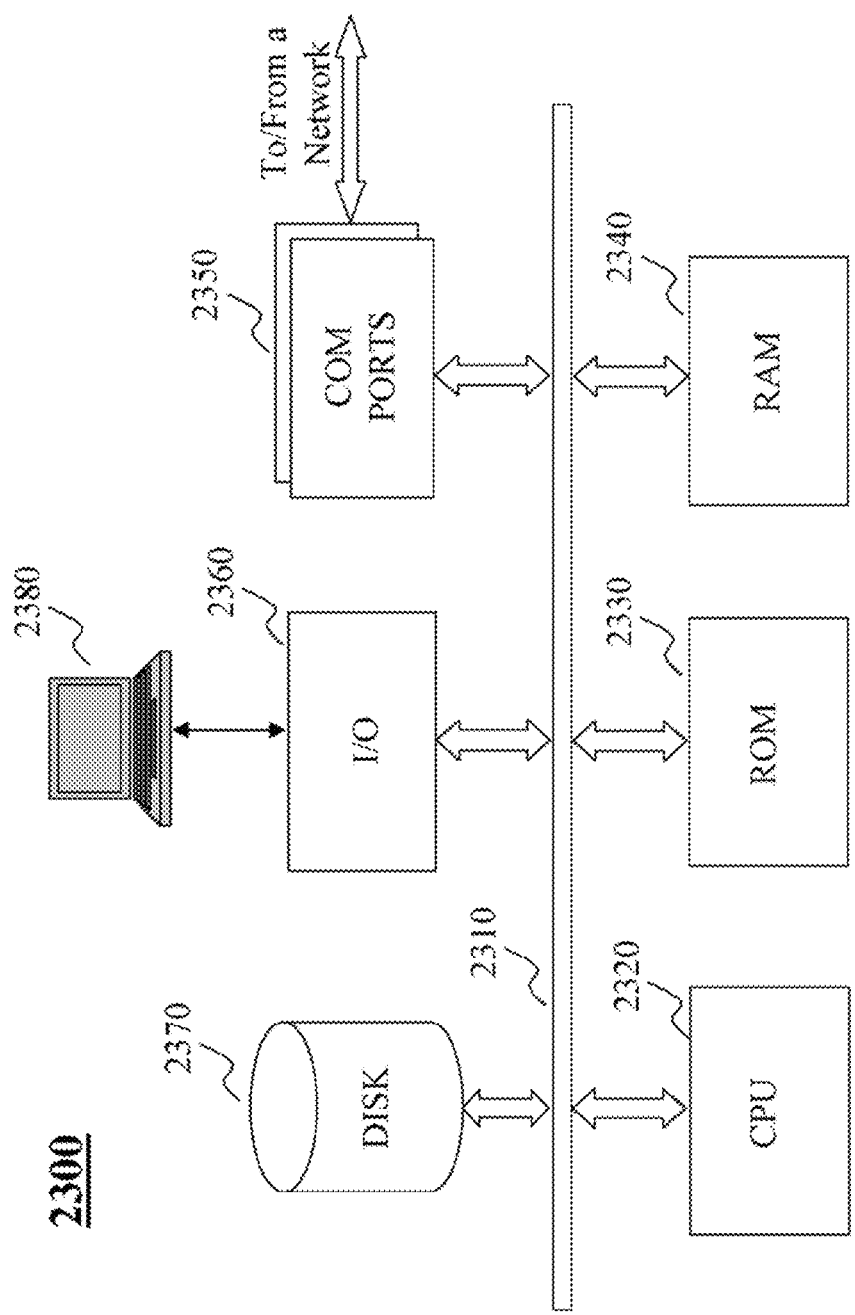
FIG. 23 depicts a general computer architecture on which the present embodiments can be implemented and has a functional block diagram illustration of a computer hardware platform which includes user interface elements.

FIG. 23 depicts a general computer architecture on which the present teaching can be implemented and has a functional block diagram illustration of a computer hardware platform which includes user interface elements. The computer may be a general purpose computer or a special purpose computer. This computer 2300 can be used to implement any components of the development and hosting platform described herein. For example, the application builder 802 that develops and generates applications, application hoster 816 which deploys and hosts applications, memory management unit 810 which determines memory schemes, and package management unit 812 which handles updating of packages to applications can all be implemented on a computer such as computer 2300, via its hardware, software program, firmware, or a combination thereof. Although only one such computer is shown, for convenience, the computer functions relating to development and hosting of applications may be implemented in a distributed fashion on a number of similar platforms, to distribute the processing load.

The computer 2300, for example, includes COM ports 2350 connected to and from a network connected thereto to facilitate data communications. The computer 2300 also includes a central processing unit (CPU) 2320, in the form of one or more processors, for executing program instructions. The exemplary computer platform includes an internal communication bus 2310, program storage and data storage of different forms, e.g., disk 2370, read only memory (ROM) 2330, or random access memory (RAM) 2340, for various data files to be processed and/or communicated by the computer, as well as possibly program instructions to be executed by the CPU. The computer 2300 also includes an I/O component 2360, supporting input/output flows between the computer and other components therein such as user interface elements 2380. The computer 2300 may also receive programming and data via network communications.

Hence, aspects of the methods of developing, deploying, and hosting applications that are interoperable across a plurality of device platforms, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated schedules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a server or host computer into the hardware platform(s) of a computing environment or other system implementing a computing environment or similar functionalities in connection with generating explanations based on user inquiries. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media includes dynamic memory, such as a main memory of such a computer platform. Tangible transmission media includes coaxial cables, copper wire, and fiber optics, including wires that form a bus within a computer system. Carrier-wave transmission media can take the form of electric or electromagenetic signals, or acoustic or light waves such as those generated during radio frequency (RF) and infrared (IR) data communications. Common forms of computer-readable media therefore include for example: a floppy disk, a flexible disk, hard disk, magnetic take, any other magnetic medium, a CD-ROM, DVD or DVD-ROM, any other optical media, punch card paper tapes, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the embodiments of the present disclosure are amenable to a variety of modifications an/or enhancements. For example, although the implementation of various components described above may be embodied in a hardware device, it can also be implemented as a software only solution—e.g., an installation on an existing server. In addition, the dynamic relation/event detector and its components as disclosed herein can be implemented as firmware, a firmware/software combination, a firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim and all applications, modifications and variations that fall within the true scope of the present teachings.

The invention claimed is:

1. A method implemented on a server device having at least one processor, storage, and a communication platform connected to a network for facilitating interoperability of a platform independent application deployed on different client devices, the method comprising:
    generating a platform independent application;
    deploying a first instance of the platform independent application on a client device for execution locally at the client device;
    hosting, at the server device, a second instance of the platform independent application;
    receiving, from the client device, an indication that a user request related to the execution of the first instance of the platform independent application is unable to be executed via the client device at that time;
    executing, at the server device, the user request via the second instance of the platform independent application in response to the indication; and
    providing, via the server device, a result in response to the user request for presentation at the client device.

2. The method of claim 1, wherein generating the platform independent application comprises:
    coding the platform independent application to include an application framework facilitating execution of the platform independent application on both the client device and the server device.

3. The method of claim 2, wherein the application framework is a JavaScript application framework including binders allowing a client device execution of the platform independent application to interface with controllers at a server device execution of the platform independent application.

4. The method of claim 1, further comprising:
    detecting settings of the client device; and
    providing packages to the client device to customize the first instance of the platform independent application for execution on the client device.

5. The method of claim 1, further comprising:
    generating, based on the processing of the user request, a graphical representation that represents a response to the user request,
    wherein providing the result comprises providing the graphical representation to the client device for presentation at the client device.

6. A machine readable non-transitory and tangible medium having information recorded for facilitating interoperability of a platform independent application deployed on different client devices, wherein the information, when read by the machine, causes the machine to perform the steps comprising:
    generating a platform independent application;
    deploying a first instance of the platform independent application on a client device for execution locally at the client device;
    hosting, at the server device, a second instance of the platform independent application;
    receiving, from the client device, an indication that a user request related to the execution of the first instance of the platform independent application is unable to be executed via the client device at that time;
    executing, at the server device, the user request via the second instance of the platform independent application in response to the indication; and
    providing, via the server device, a result in response to the user request for presentation at the client device.

7. The machine readable non-transitory and tangible medium of claim 6, wherein the information, when read by the machine, causes the machine to further perform:
    coding the platform independent application to include an application framework facilitating execution of the platform independent application on both the client device and the server device.

8. The machine readable non-transitory and tangible medium of claim 7, wherein the application framework is a JavaScript application framework including binders allowing a client device execution of the platform independent application to interface with controllers at a server device execution of the platform independent application.

9. The machine readable non-transitory and tangible medium of claim 6, wherein the information, when read by the machine, causes the machine to further perform:
    detecting settings of the client device; and
    providing packages to the client device to customize the first instance of the platform independent application for execution on the client device.

10. The machine readable non-transitory and tangible medium of claim 6, wherein the information, when read by the machine, causes the machine to further perform:
    generating, based on the processing of the user request, a graphical representation that represents a response to the user request,
    wherein providing the result comprises providing the graphical representation to the client device for presentation at the client device.

11. A system for facilitating interoperability of a platform independent application deployed on different client devices, comprising:
    an application builder for generating a platform independent application;
    a server device for:
        deploying a first instance of the platform independent application on a client device for execution locally at the client device;
        hosting, at the server device, a second instance of the platform independent application;
        receiving, from the client device, an indication that a user request related to the execution of the first instance of the platform independent application is unable to be executed via the client device at that time;
        executing the user request via the second instance of the platform independent application in response to the indication; and
        providing a result in response to the user request for presentation at the client device.

12. The system of claim 11, wherein generating the application comprises coding the application to include an application framework facilitating execution of the platform independent application on both the client device and the server device.

13. The system of claim 12, wherein the application framework is a JavaScript application framework including binders allowing a client device execution of the platform independent application to interface with controllers at a server device execution of the platform independent application.

14. The system of claim 11, further comprising:
    a package management unit for:
        detecting settings of the client device; and
        providing packages to the client device to customize the first instance of the platform independent application for execution on the client device.

15. The system of claim 11, wherein the server device generates, based on the processing of the user request, a graphical representation that represents a response to the user request, and wherein providing the result comprises providing the graphical representation to the client device for presentation at the client device.

16. A system for facilitating interoperability of a platform independent application deployed on different client devices, comprising:
    at least one computing device having at least one processor programmed with computer program instructions which, when executed, cause the at least one computing device to:
        generating a platform independent application;
        deploying a first instance of the platform independent application on a client device for execution locally at the client device;
        hosting, at the at least one computing device, a second instance of the platform independent application;
        receiving, from the client device, an indication that a user request related to the execution of the first instance of the platform independent application is unable to be executed via the client device at that time;
        executing, at the at least one computing device, the user request via the second instance of the platform independent application in response to the indication; and
        providing, via the at least one computing device, a result in response to the user request for presentation at the client device.

17. A method implemented on a first computing device having at least one processor, storage, and a communication platform connected to a network for facilitating interoperability of a platform independent application deployed on different devices, the method comprising:
    executing a first instance of a platform independent application on the first computing device;
    receiving a user request for the first instance of the platform independent application;
    determining whether the user request can be executed via the first instance at the first computing device;
    when it is determined that the user request cannot be executed via the first instance at the first computing device at that time, transmitting the user request to a second computing device hosting a second instance of the platform independent application for execution via the second instance; and
    receiving a result in response to the user request from the second computing device.

18. The method of claim 17, further comprising:
    receiving a graphical representation of the result in response to the user request; and
    displaying the graphical representation on the first computing device.

19. A system for facilitating interoperability of a platform independent application deployed on different client devices, comprising:
    a first computing device having at least one processor programmed with computer program instructions which, when executed, cause the first computing device to:
        execute a first instance of a platform independent application on the first computing device;
        receive a user request for the first instance of the platform independent application;
        determine whether the user request can be executed via the first instance at the first computing device;
        when it is determined that the user request cannot be executed via the first instance at the first computing device at that time, transmit the user request to a second computing device hosting a second instance of the platform independent application for execution via the second instance; and
        receive a result in response to the user request from the second computing device.

20. The system of claim 19, wherein the first computing device is further caused to:
    receive a graphical representation of the result in response to the user request; and
    display the graphical representation on the first computing device.

21. The system of claim 16, wherein the at least one computing device is further caused to:
    generate, based on the processing of the user request, a graphical representation that represents a response to the user request,
    wherein providing the result comprises providing the graphical representation to the client device for presentation at the client device.

* * * * *